Oct. 9, 1956
E. E. NASH
2,766,052
ARTICULATED WAGON HAVING RELATIVELY ROCKABLE AXLES
Filed Jan. 4, 1954
2 Sheets-Sheet 1
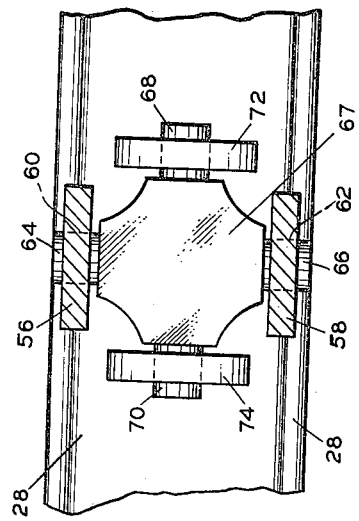
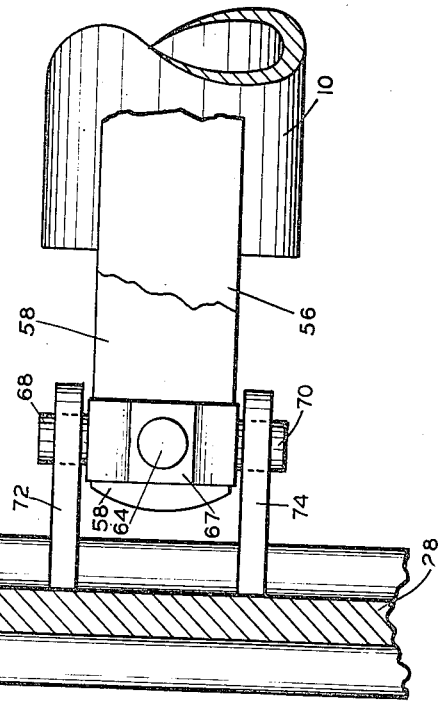
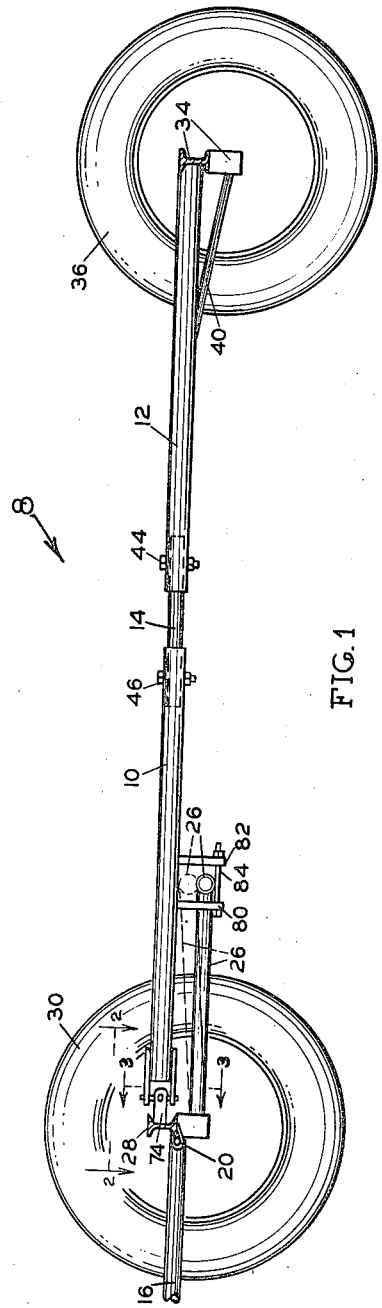
INVENTOR.
ELVIN E. NASH
BY
*Arthur H. Sturges*
ATTORNEY Oct. 9, 1956  E. E. NASH  2,766,052
ARTICULATED WAGON HAVING RELATIVELY ROCKABLE AXLES
Filed Jan. 4, 1954
2 Sheets-Sheet 2
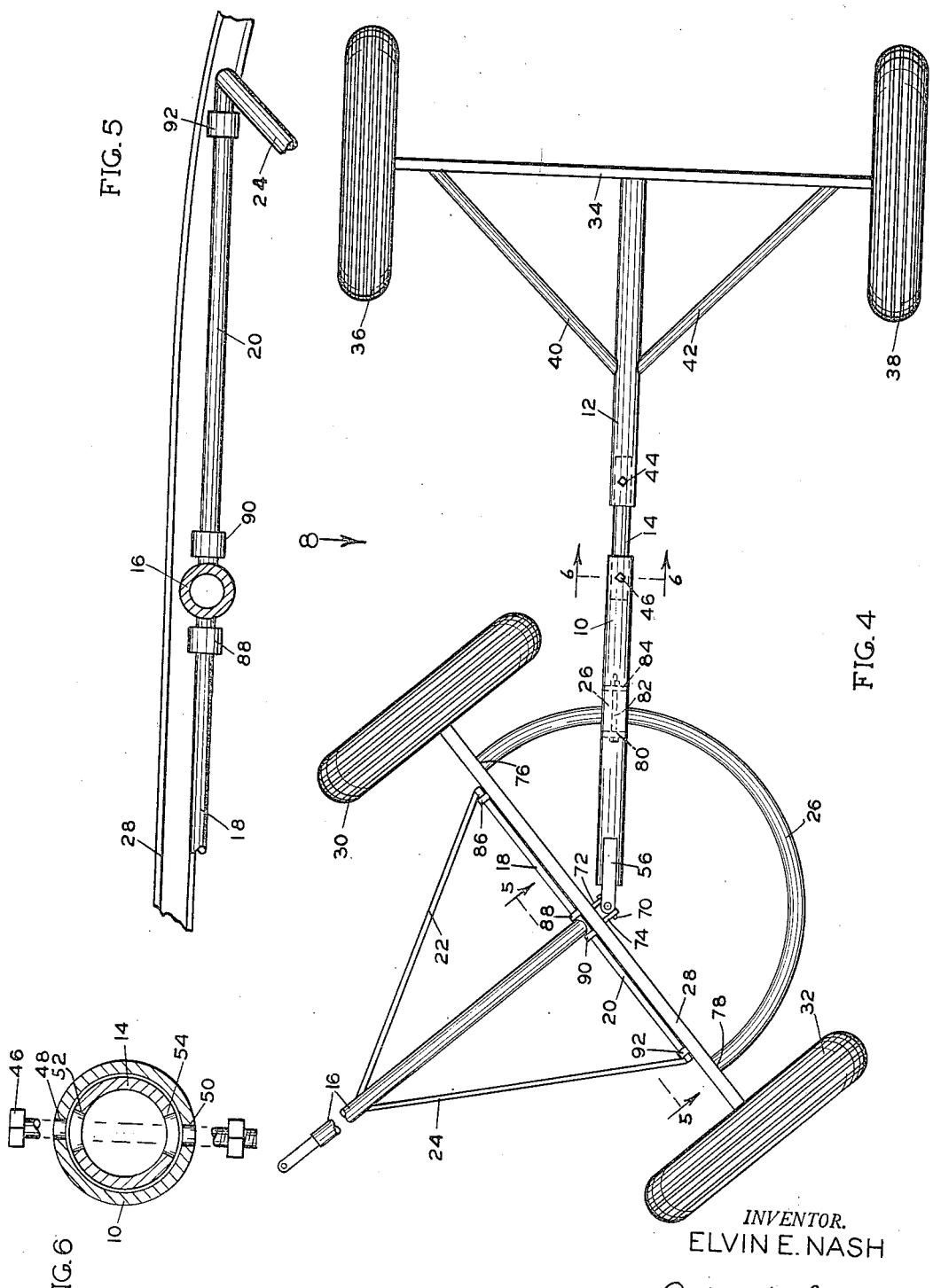
INVENTOR.
ELVIN E. NASH
Arthur H. Sturges
ATTORNEY United States Patent Office 2,766,052
Patented Oct. 9, 1956

2,766,052
ARTICULATED WAGON HAVING RELATIVELY ROCKABLE AXLES

Elvin E. Nash, Nodaway, Iowa

Application January 4, 1954, Serial No. 401,751

1 Claim. (Cl. 280—109)

This invention relates to wheeled vehicles of the four wheel trailer type, such as a farm wagon, wherein wheels are carried by front and rear axles with a tongue extended from the front axle and with the rear axle connected to the front axle with a reach rod, and in particular means for forming a universal joint in the connection between the forward end of the reach rod and front axle and means for providing a swivel connection in the reach rod to permit one axle to twist in relation to the other.

The purpose of this invention is to provide means for reducing torsional strains in the reach rod of a vehicle, such as a wagon, to a minimum to prevent breaking the reach rod.

In a reach rod of conventional design the continuous twisting resulting from traveling over uneven ground produces shocks and strains in the connection of the reach rod to the front axle of a trailer, wagon chassis or gear, and also causes torsional strains in the intermediate portion of the reach rod between the segment of the front axle and braces of the rear axle. These strains crack and often break the reach rods and with this thought in mind this invention contemplates a trailer chassis, such as for a wagon, with the forward end of the rod connected to the front axle with a universal joint and with the intermediate part provided with a tubular connection having elongated slots whereby one section is adapted to turn in relation to another.

The reach rod of trailers and particularly heavily laden farm wagons is subjected to severe strains and stresses with the wagons traveling over rough terrain and should the forward wheels strike the side of a deep gulley the shock load transmitted from the wheels is carried directly to the point where the reach rod is connected to the front axle which results in the failure of the connection.

The object of this invention is, therefore, to provide means for forming flexible connections between the reach rod and front axle of a trailer or wagon chassis and the forward and rear portions of the reach rod whereby the wheels of the vehicle are free to travel over uneven terrain without causing stresses and strains in the reach rod or in connections of the reach rod to parts of the chassis.

Another object of the invention is to provide means for connecting a segment or radius rod connected to the ends of the front axle to the reach rod whereby shock loads resulting from wheels of the front axle striking hummocks, rocks, and the like are dissipated through the articulation of the connecting elements.

A further object of the invention is to provide an improved reach rod for a trailer or wagon chassis which permits freedom of movement in the rod and between the rod and front axle in which the rod may readily be installed in vehicles now in use.

A still further object of the invention is to provide a reach rod particularly adapted for farm wagons in which one end of the rod is free to turn in relation to the other and in which the forward end of the rod is connected to the front axle with a universal joint in which the reach rod is of a simple and economical construction.

With these and other objects and advantages in view the invention embodies a tubular reach rod having a swivel connection between front and rear sections thereof and a universal joint between the forward end and the front axle of a wagon or the like, and in which the tongue of the wagon is pivotally connected to the front axle to permit vertical swinging movement thereof.

Other features and advantages of the invention will appear from the following description taken in connection with the drawings, wherein:

Figure 1 is a longitudinal section through the chassis of a four wheel vehicle with the reach rod of the vehicle shown in elevation, with the extended end of the tongue broken away, and with a radius or motion limiting rod shown in one position in full lines and in another position in broken lines.

Figure 2 is a plan view taken on line 2—2 of Figure 1 with the parts shown on an enlarged scale and with parts broken away illustrating the universal joint between the forward end of the reach rod and front axle.

Figure 3 is a cross section through the universal joint taken on line 3—3 of Figure 1, also with the parts shown on an enlarged scale and with parts broken away.

Figure 4 is a plan view of a vehicle chassis having the improved reach rod and tongue mounting incorporated therein showing the front wheels turned toward one side, and with part of the tongue broken away.

Figure 5 is a detail showing a section taken on line 5—5 of Figure 4 illustrating a vertically swingable connection for mounting a tongue on a front axle, one side of the mounting being broken away, and the parts being shown on an enlarged scale.

Figure 6 is a cross section taken on line 6—6 of Figure 4 with the parts shown on an enlarged scale, showing the turning connection in the intermediate portion of the reach rod.

While one embodiment of the invention is illustrated in the above-referred-to drawings, it is to be understood that they are merely for the purpose of illustration and that various changes in construction may be resorted to in the course of manufacture in order that the invention may be utilized to the best advantage according to circumstances which may arise without in any way departing from the spirit and intention of the device which is to be limited only in accordance with the appended claims. And while there is stated the primary field of utility of the invention it remains obvious that it may be employed in any other capacity wherein it may be found applicable.

In the accompanying drawings, and in the following specification, the same reference characters are used to designate the same parts and elements throughout, and in which the numeral 8 refers to the invention in its entirety, numeral 10 indicating the tubular forward section of the reach rod, numeral 12 the rear section, numeral 14 a connecting tube, numeral 16 a tongue, the rear end of which is connected to sections 18 and 20 of braces 22 and 24, and numeral 26 a segment or motion limiting rod extended from the front axle, which is indicated by the numeral 28, and positioned below the reach rod.

The front axle is provided with wheels 30 and 32, and a rear axle 34 which is secured to the rear end of the section 12 of the reach rod is provided with wheels 36 and 38. The section 12 is supported from the rear axle with braces 40 and 42, the ends of which are secured, preferably by welding, to the tube and axle. The rear end of the section 12 of the reach rod is also secured to the rear axle 34, such as by welding.

The connecting tube 14 extends into the forward end of the section 12, in which it is secured by a bolt 44, and the forward end extends into the rear end of the section 10 in which it is secured by a bolt 46. As illustrated in Figure 6, the bolt 46 nests snugly in openings 48 and 50 in the section 10 of the reach rod and extends through elongated slots 52 and 54 in the tube 14, whereby freedom is provided so that one tube may turn in relation to the other. Similar slots are provided in the opposite end of the connecting tube 14 and with the bolt 44 extended through the slots the rear section 12 is adapted to turn in relation to the connecting tube and forward section 10 of the reach rod.

The forward end of the section 10 is connected to the front axle with a universal joint formed with an upper bar 56 and a lower bar 58, the bars being welded to upper and lower surfaces of the section 10, respectively, and the bars being provided with openings 60 and 62 for pins 64 and 66 of a block 67 having trunnions 68 and 70 extended from the sides. The trunnions 68 and 70 are pivotally mounted in bearings 72 and 74 which extend rearwardly from the front axle 28, as shown in Figure 2. By this means the reach rod is free to swing vertically or laterally in relation to the front axle, whereby either end of the vehicle may swing upwardly or downwardly or toward either side.

The motion limiting rod or segment 26 is secured to the front axle 28, such as by welding, at the points 76 and 78 and, as shown in Figure 1, the rod 26 extends between plates 80 and 82, which extend downwardly from the section 10 of the reach rod. The rod 26 is secured in the area between the plates with a bolt 84 which is spaced from the section 10 a sufficient distance to permit the rod 26 to move upwardly and downwardly as the vehicle travels over rough terrain.

The rear end of the tongue 16 is secured, preferably by welding, to the sections 18 and 20 of the braces 22 and 24, respectively, and, as shown in Figures 4 and 5, the section 18 is pivotally mounted on the front axle 28 with loops 86 and 88, and the section 20 is similarly mounted with loops 90 and 92. The forward ends of the braces 22 and 24 are secured to the sides of the tongue.

With the parts designed and assembled in this manner an improved chassis is provided for trailers, farm wagons, and the like in which one or both wheels of a front or rear axle may ride over a comparatively high hummock, rock, or other obstruction, without danger of placing excessive strains and stresses in reach or reach rod and with substantially any possibility of damaging or breaking the reach rod eliminated.

From the foregoing specification it will become apparent that the invention disclosed will adequately accomplish the functions for which it has been designed and in an economical manner, and that its simplicity, accuracy, and ease of operation are such as to provide a relatively inexpensive device considering what it will accomplish and that it will find an important place in the art to which it appertains when once placed on the market.

It is though that persons skilled in the art to which the invention relates will be able to obtain a clear understanding of the invention after considering the description in connection with the drawings. Therefore, a more lengthy description is regarded as unnecessary.

Changes in shape, size, and rearrangement of details and parts such as come within the purview of the invention claimed may be resorted to in actual practice, if desired.

Having now described the invention that which is claimed to be new and desired to be procured by Letters Patent, is:

In a wagon chassis, the combination which comprises a front axle having wheels on the ends, a rear axle also having wheels on the ends, a reach rod including tubular forward and rear sections extended between the front and rear axles, the rear end of the rear section of the reach rod being secured to the rear axle, a connecting member having transversely disposed slots in the ends extended into the forward end of the rear section and rear end of the forward section of the reach rod, bolts extended through the sections of the reach rod and slots of the connecting member, upper and lower bars extended from the forward section of the reach rod, a block having trunnions extended from sides thereof and pins extended from upper and lower surfaces positioned between said upper and lower bars with the pins thereof extended through openings in the bars, spaced bearings extended rearwardly from the front axle and having openings therein positioned to receive the trunnions of said block, a segment extended from the front axle and through a socket depending from the forward section of the reach rod, and a tongue pivotally mounted for vertical swinging movement on said front axle.

References Cited in the file of this patent

UNITED STATES PATENTS

| Number | Name | Date |
|---|---|---|
| 217,601 | Fowler | July 15, 1879 |
| 291,132 | Beach | Jan. 1, 1884 |
| 376,779 | Morgan | Jan. 24, 1888 |
| 1,132,398 | Sharp | Mar. 16, 1915 |
| 2,457,397 | Richards | Dec. 28, 1948 |